E. H. PARKER.
Water-Tanks for Fire-Proof Safes, &c.
No. 147,681. Patented Feb. 17, 1874.
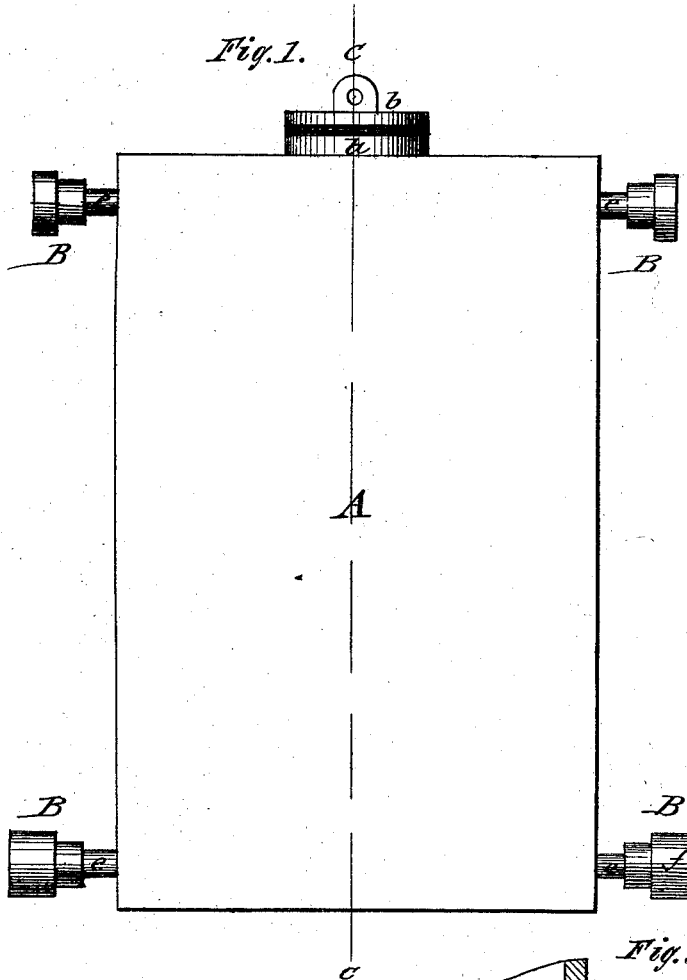
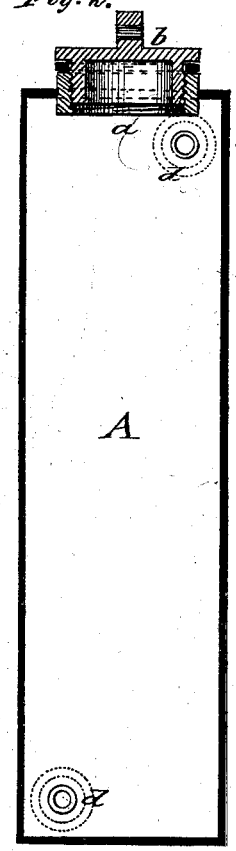
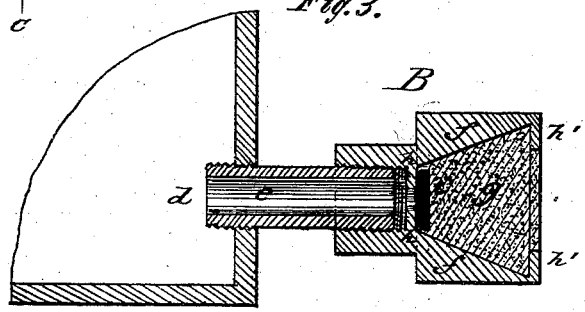
Witnesses:
P. C. Dieterich
C. Sedgwick
Inventor:
E. H. Parker
Per Munn & Co.
Attorneys.

UNITED STATES PATENT OFFICE.

EDWARD H. PARKER, OF POUGHKEEPSIE, NEW YORK.

IMPROVEMENT IN WATER-TANKS FOR FIRE-PROOF SAFES, &c.

Specification forming part of Letters Patent No. 147,681, dated February 17, 1874; application filed May 31, 1873.

*To all whom it may concern:*

Be it known that I, EDWARD H. PARKER, of Poughkeepsie, in the county of Dutchess and State of New York, have invented a new and Improved Self-Acting Safety-Tank for Safes, Vaults, &c., of which the following is a specification:

In the accompanying drawing, Figure 1 represents a front view of my improved safety-tank for safes, vaults, &c.; Fig. 2, a vertical section of the same on the line c c, Fig. 1; and Fig. 3, a detail vertical longitudinal section of one of the self-acting valves of the tank.

Similar letters of reference indicate corresponding parts.

The invention consists in providing a water-tank for safes, &c., with a valve having shouldered head, disk-closed recess, and a melting mixture, with an outer protecting layer, as hereinafter described.

In the drawing, A represents the tank, of metal, glass, earthenware, hard rubber, or other suitable materials.

The shape of the tank is such as will fit any spare space in safes already built, or in new safes of such shape as is best adapted. The tank may be made to fit into one of the bookstalls, or hung up to the top, or in any other manner.

Each tank is provided at its upper side with an opening, *a*, which may be closed air-tight by the metallic or hard rubber cap *b*.

The water is filled in through the opening or "feed" *a*, and the development of fungi in it is effectually prevented by adding proper proportions of carbolic acid or cresylic acid, or both. The air-tight closing of the tank prevents the evaporation of the water, and the mildewing of the contents of the safe.

Two or more openings, *d*, are made near the top and bottom of the tank, preferably one at each side, so that whatever position the tank may take in the safe, or on which side the safe may be tumbled, the water in the tank may be discharged. Small tubes, *e*, are soldered or otherwise connected to the openings *d*, and provided with a screw-thread at their outer side, over which the valves B are placed. The valves B may also be screwed directly into the tank A. The valves B are made of any suitable metal, and have a projecting head, *f*, with recess *g*, as indicated in Fig. 3. The diameter of the head *f* is about twice that of the opening *d*, and head *f* is provided with an inner flange, *h*, and face flange or shoulder *h'*. The recess *g* of valve B is closed up by placing on the opening toward the tank a disk, *i*, of thin rubber or metal, resting on the inner flange *h*. The remainder of recess *g* is then filled with a mixture of beeswax and plaster-of-paris, poured over in a melted state, and carefully pressed or hammered in, so as to make the closing perfectly water-tight. The outer surface of the mixture is smoothed off and covered with a solution of shellac, or with a layer of thin metal, to protect it from insects and the action of the atmosphere. The thickness of the wax mixture corresponds to the hydrostatic pressure of the water, and varies with different sizes of tanks. The disk *i* protects the inner surface of the closing mixture from the action of the tank-water.

The tank, being closed air and water-tight, is placed into the safe or vault. In case of fire, the increase of temperature to about 150° Fahrenheit will melt the wax, and it will run out of the recesses *g*, the hydrostatic pressure forcing at the same time the rubber disks from the inner openings and allowing the water to escape. The upper valves of the tank admit the air, so that an uninterrupted flow of water is established.

The water in the tanks may be replaced by opening the feed and screwing off one of the lower valves, till the water has run out. The valve is then screwed on again, the tank refilled, and the feed-cap placed on the top opening, the tank being ready to fulfill its design.

Having thus described my invention, I claim as new and desire to secure by Letters Patent—

The valve B, having head *f*, with shoulders *h h'* and recess *g*, closed by disk *i*, and melting mixture with outer protecting layer, substantially as and for the purpose described.

EDWARD H. PARKER.

Witnesses:
  W. FARRINGTON,
  JNO. P. M. TALLMAN.